United States Patent [19]

Thorp et al.

[11] Patent Number: 5,054,588
[45] Date of Patent: Oct. 8, 1991

[54] TORQUE SENSING AUTOMATIC SHUT-OFF AND RESET CLUTCH FOR SCREWDRIVERS, NUTSETTERS AND THE LIKE

[75] Inventors: Phil D. Thorp; Ward W. Harvey; Douglas E. Pyles, all of Bryan, Ohio

[73] Assignee: The Aro Corporation, Bryan, Ohio

[21] Appl. No.: 576,283

[22] Filed: Aug. 31, 1990

[51] Int. Cl.⁵ .................. F16D 43/20; B25B 23/14
[52] U.S. Cl. .................. 192/0.034; 173/12; 192/56 R; 192/150
[58] Field of Search ........... 192/0.034, 56 R, 150; 173/12

[56] References Cited

U.S. PATENT DOCUMENTS

| | | | |
|---|---|---|---|
| 3,237,742 | 3/1966 | Ulbing | 192/56 R X |
| 3,442,362 | 5/1969 | Bangerter | 173/12 X |
| 3,766,990 | 10/1973 | Eckman et al. | 173/12 |
| 4,071,092 | 1/1978 | Wallace | 173/12 |
| 4,078,618 | 3/1978 | DePagter et al. | 173/12 |
| 4,154,308 | 5/1979 | Goldsberry et al. | 173/12 |
| 4,576,270 | 3/1986 | Baltz et al. | 173/12 X |
| 4,844,177 | 7/1989 | Robinson et al. | 173/12 |
| 4,880,064 | 11/1989 | Willoughby et al. | 173/12 |

Primary Examiner—Rodney H. Bonck
Attorney, Agent, or Firm—Allegretti & Witcoff, Ltd.

[57] ABSTRACT

An improved torque control and fluid shut-off mechanism for a fluid operated tool includes a driving clutch member and a driven bit holder connected by ball bearings retained by the clutch member which engages in pockets in the bit holder. The pockets include a specific ramp construction which insures that the threshold torque level of the tool in the forward direction is less than the threshold level in the reverse direction.

6 Claims, 4 Drawing Sheets

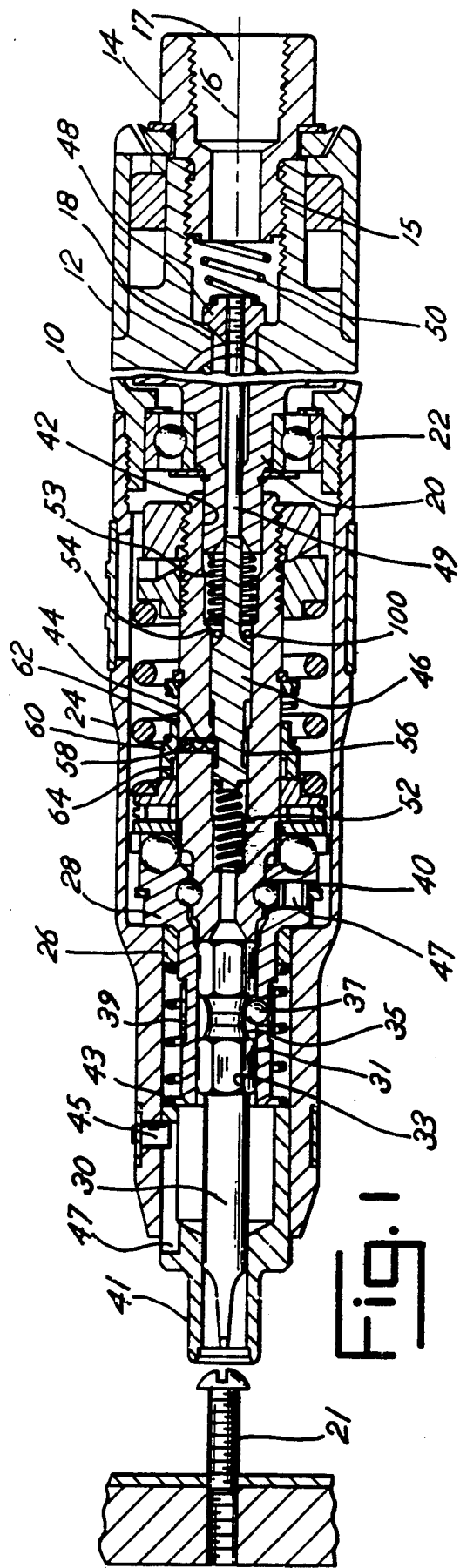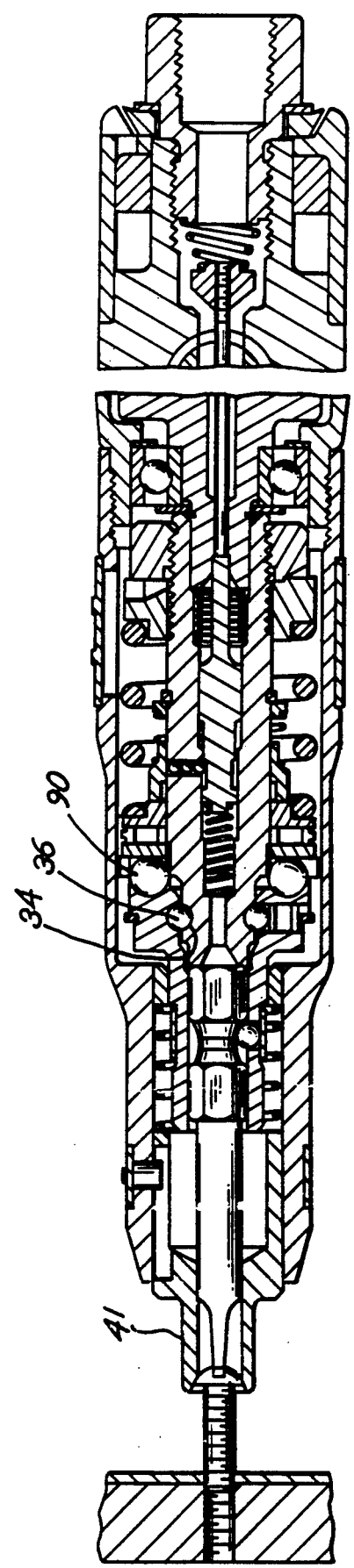

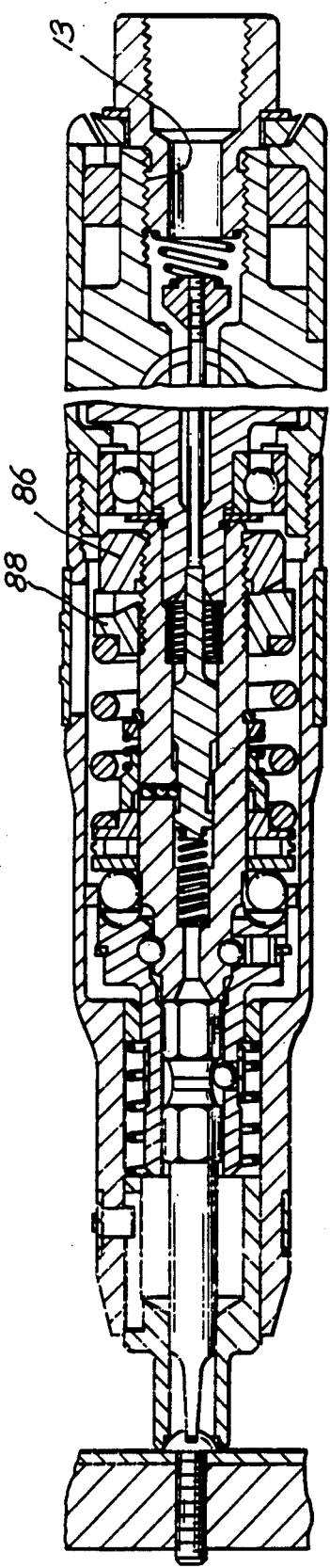
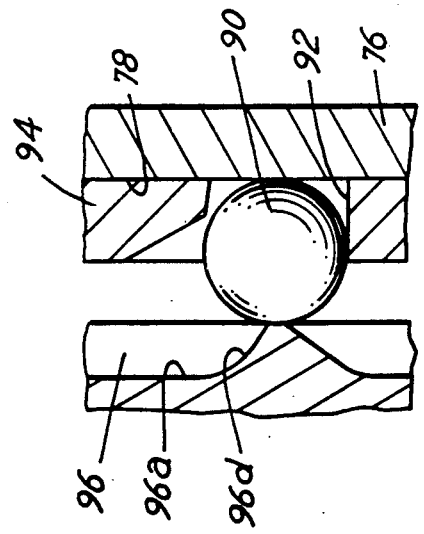
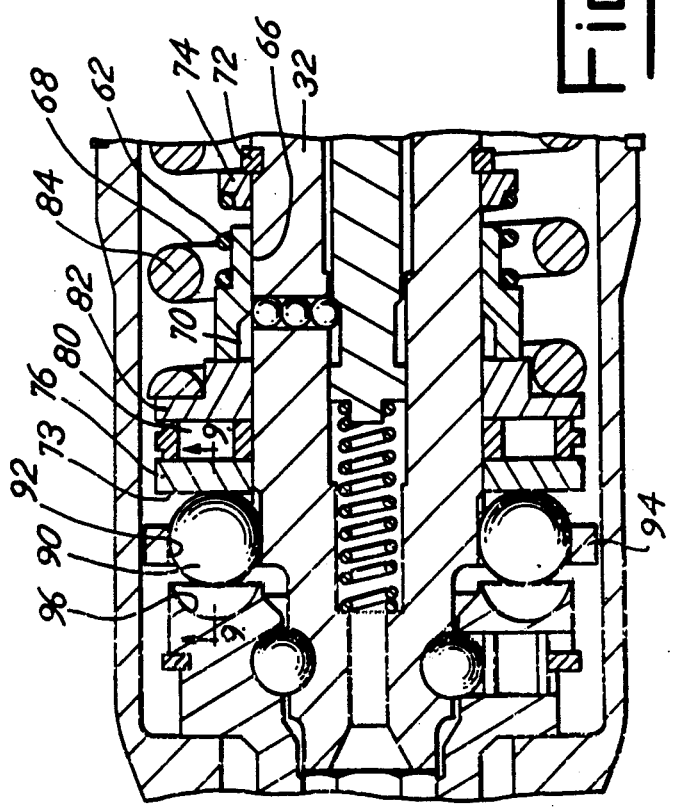
Fig. 7
Fig. 9
Fig. 8

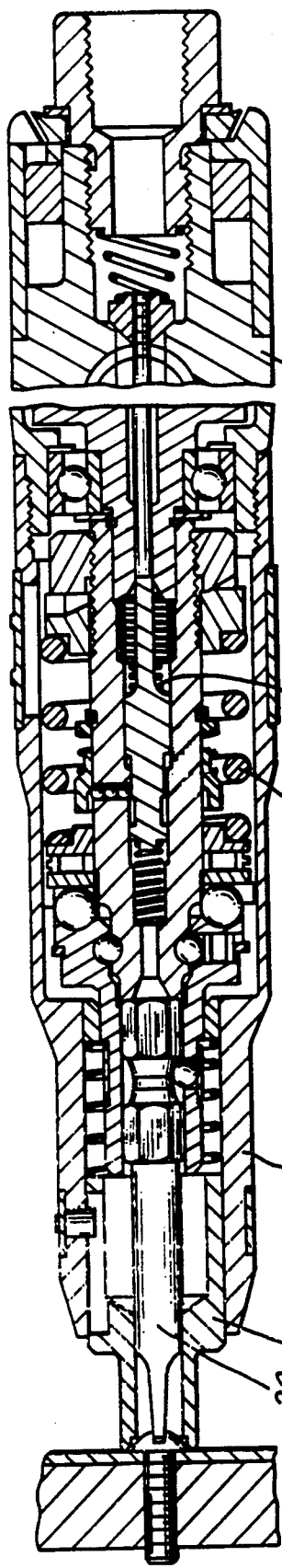
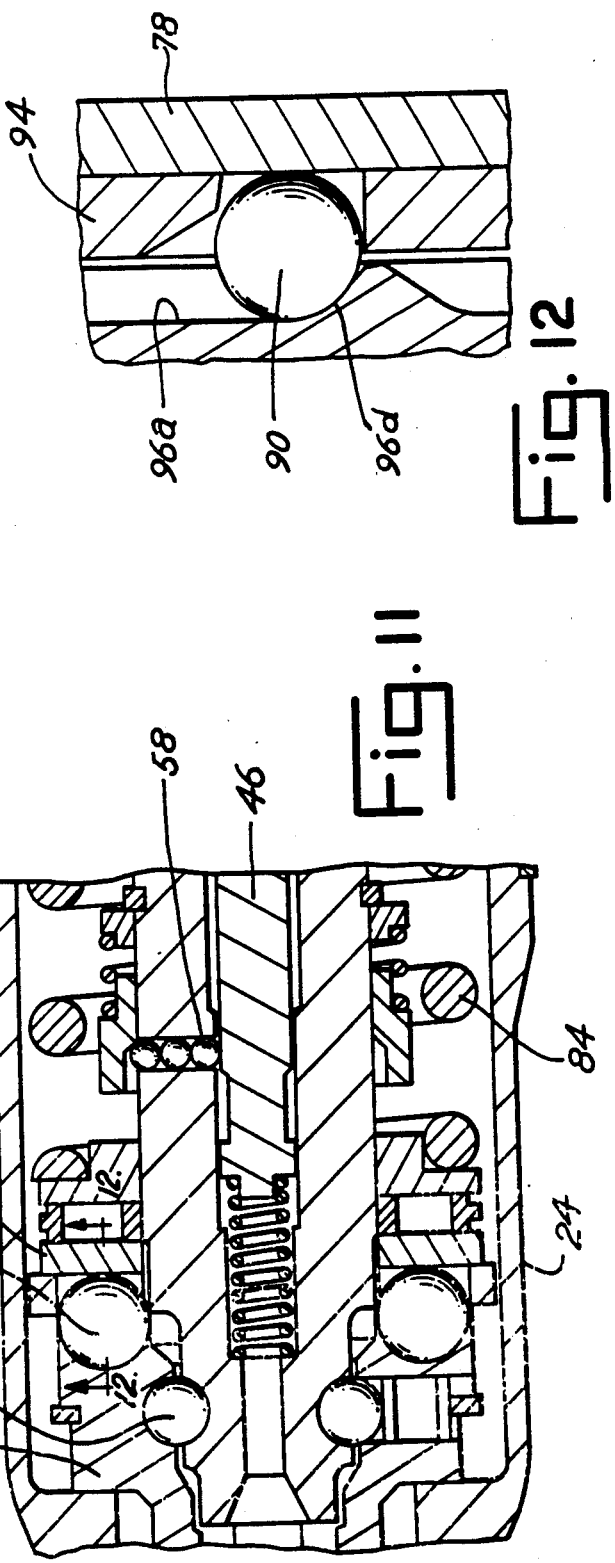
Fig. 10
Fig. 11
Fig. 12

TORQUE SENSING AUTOMATIC SHUT-OFF AND RESET CLUTCH FOR SCREWDRIVERS, NUTSETTERS AND THE LIKE

BACKGROUND OF THE INVENTION

This invention relates to an improved torque controlled fluid shut-off and reset mechanism for a fluid operated tool.

Fluid operated tools for driving fasteners and the like typically incorporate a rotary vane air motor to drive a rotary output shaft connected to a tool bit. Such tools are often equipped with a clutch mechanism that responds to the torque imparted by the tool onto a fastener. When a specific torque is reached, the clutch mechanism automatically decouples the motor from the tool bit and terminates further tool output to the fastener. Further, in such tools, starting the tool is often effected by positioning the tool bit against the fastener and axially translating the bit holder by pushing it against the fastener. Axial translation then opens a fluid valve to the air motor for the tool.

Combining a start-up control, torque control as well as a shut-off control mechanism in a single tool is a desirable goal and various tools include such combinations. Prior art references which disclose devices of this general nature include U.S. Pat. No. 4,576,270 issued Mar. 18, 1986, for a torque control and fluid shut-off mechanism for a fluid operated tool. Equally relevant is U.S. Pat. No. 4,880,064, entitled "Torque Sensing Automatic Shut-off And Reset Clutch For Screwdrivers, Nutsetters and The Like", issued on Nov. 14, 1989. U.S. Pat. No. 4,880,064 is incorporated herewith by reference. This patent teaches the use of a torque control and fluid shut-off mechanism for a fluid operated tool which includes a bit holder and a driving clutch member which are connected so as to uniformly and co-jointly move in an axial direction independent of rotary movement associated with rotary output of the air motor. Spring biased ball bearings provide for co-joint rotary movement which terminates when the spring biasing force is associated with the driving clutch member exceeds a threshold level so as to cause the ball bearings to disengage from a bit holder. A locking sleeve is fitted over the driving clutch member and cooperates with a control rod for fluid inlet to the rotary vane air motor. This arrangement controls initiation of operation, termination of operation and resetting of the tool.

The present invention comprises an improvement with respect to the subject matter of U.S. Pat. No. 4,880,064. More specifically the present invention relates to an improved construction of the ball bearing connection between the clutch members and bit holder. Additional improved features are also disclosed.

SUMMARY OF THE INVENTION

Briefly, the present invention relates to a fluid powered, rotary output tool that is useful as a screwdriver, nut runner or the like. The tool includes a housing which encloses a fluid driven motor typically an air vane rotary motor. The motor, either directly or through a transmission, drives a rotary output shaft. The shaft defines a center line axis for the tool. A fluid inlet to the motor is arranged on that axis and provides a passage for pressurized air to operate the motor. A valve member positioned in the fluid inlet passage controls the pressurized fluid flow to the motor. The valve member is responsive to a torque sensitive clutch mechanism and moves to the open or closed positions in response to the torque sensing capability of the clutch mechanism.

The tool includes a bit holder at the forward end of the tool which is aligned axially with the motor output shaft. The clutch mechanism is positioned intermediate the bit holder and the output shaft of the air motor. Thus, the motor output shaft, the bit holder and the clutch mechanism are all substantially co-axial and are retained within the housing for the tool so that they can all rotate together for purposes of operation of the tool as a screwdriver or the like.

The invention specifically relates to the particular construction of the clutch mechanism. As previously mentioned, U.S. Pat. No. 4,880,064 discloses a similar torque sensing control mechanism. The present invention comprises an improvement thereover.

Thus, the clutch mechanism includes a driving clutch member which is coupled to the bit holder for axial movement therewith. The clutch member is also drivingly coupled at its opposite end to the output shaft of the air motor or a gearing train intermediate the motor and the clutch member. Connection of the driving clutch member to the bit holder is effected by means of ball bearings which are spherical in shape in the preferred embodiment. The clutch member which is coupled to the bit holder is thus designed to permit rotation of the clutch member with respect to the bit holder under certain torque conditions that exceed a predetermined threshold. Normally, therefore, the spring biased bearings are retained by the clutch member and engage with pockets associated with the bit holder. During normal operation of the tool, rotary output of the driving clutch member is imparted to the bit holder and thus to the fastener as a result of the described driving engagement of the roller members or bearings in the bit holder pockets. The pockets have a particular configuration which permit the roller members to slide for a short distance in the pockets upward along a ramp which is inclined so that the air supply to the air motor is terminated when the rollers sufficiently slide along the ramp. The roller members thus slide to a position to effect disengagement of the clutch member from the bit holder and simultaneously through a series of rods cause the air motor valve to close. The specific mechanism for terminating fluid flow to the motor is very similar to that shown in U.S. Pat. No. 4,880,064 which is incorporated herewith by reference. Improvements include, however, a biasing means associated with the control rods so as to impart a uniform biasing force on those rods and thereby increase the stability of the operation of the air tool. Also, it is the particular configuration of the pockets which constitute, in part and in combination, the subject matter of the invention.

Thus, it is an object of the invention to provide an improved torque responsive fluid power tool which terminates torque drive output from the tool upon reaching a torque threshold level.

Another object of the invention is to provide an improved torque responsive fluid powered tool wherein the tool bit is translated axially in order to initiate operation of the tool by opening the fluid control valve to the air motor for the tool and further wherein the fluid control valve to the air motor for the tool is closed in response to a threshold torque.

It is a further object of the invention to provide an improved torque responsive fluid power tool wherein sensing of the torque threshold is effected by cooperative interaction of a driving clutch member interconnected with a bit holder by means of biased roller members which cooperate with a ramp in one of the bit holder or driving clutch member, the ramp having a particular shape and configuration to enhance control.

Yet another object of the invention is to provide an improved torque responsive fluid power tool wherein sensing a torque threshold by a cooperative driving member and a bit holder or driven member also acts to release a fluid inlet control valve, thereby shutting off fluid supply to the motor.

A further object of the invention is provide an improved torque responsive fluid powered tool which automatically terminates operation of the tool upon reaching a threshold level of torque and which is resettable upon termination of fluid supply to the motor of the tool followed by mechanical release of the tool from the fastener upon which the tool has been operating.

These and other objects, advantages and features of the invention will be set forth in the detailed description which follows.

BRIEF DESCRIPTION OF THE DRAWING

In the detailed description which follows, reference will be made to the drawing comprised of the following FIGURES:

FIG. 1 is a longitudinal cross-sectional view of a rotary vane air motor driven fastening tool incorporating the subject matter of the present invention prior to positioning the tool on a fastener;

FIG. 2 is a longitudinal cross-sectional view similar to FIG. 1 wherein the tool has been positioned against a fastener so as to initiate operation of the tool;

FIG. 7 is a longitudinal cross-sectional view of the tool as the clutch mechanism has become operative to initiate the beginning or the release of the valve to close the rotary air motor;

FIG. 8 is an enlarged longitudinal cross-sectional view of the clutch mechanism depicted in FIG. 7;

FIG. 9 is an enlarged cross-sectional view of the interaction of the roller members and the bit holder in the configuration depicted in FIG. 8;

FIG. 10 is a longitudinal cross-sectional view of the tool prior to resetting of the valve for the rotary vane air motor;

FIG. 11 is an enlarged cross-sectional view showing the clutch mechanism and reset mechanism of FIG. 10; and FIG. 12 is an enlarged cross-sectional view showing the interaction of the roller members and bit holder as depicted in FIG. 11.

DESCRIPTION OF THE PREFERRED EMBODIMENT

General Construction

Figure 3:
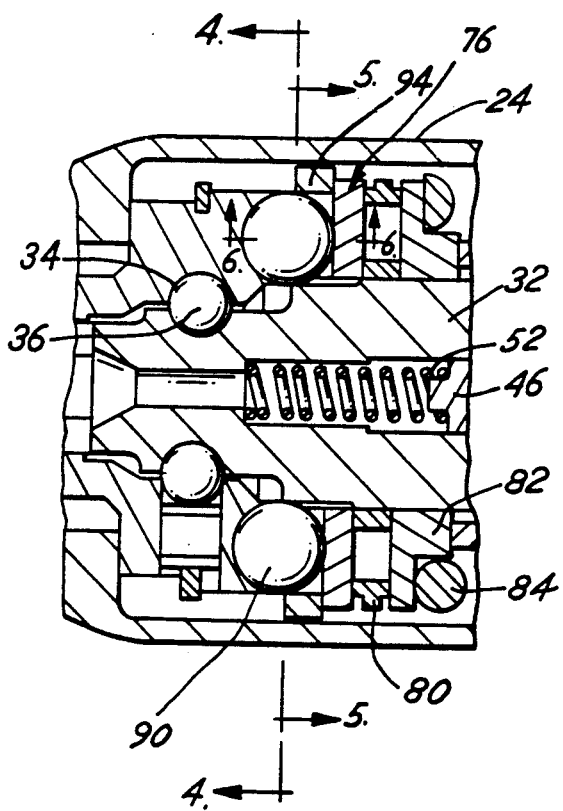
FIG. 3 is an enlarged cross-sectional view of the clutch mechanism as depicted in FIG. 2.
Figure 4:
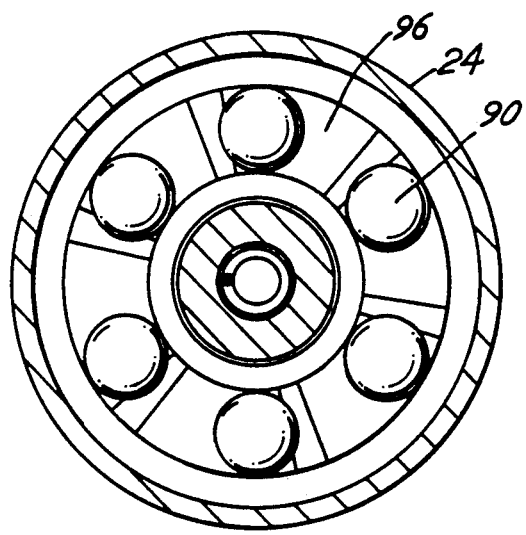
FIG. 4 is a transverse cross-sectional view taken along the line 4—4 in FIG. 3.
Figure 5:
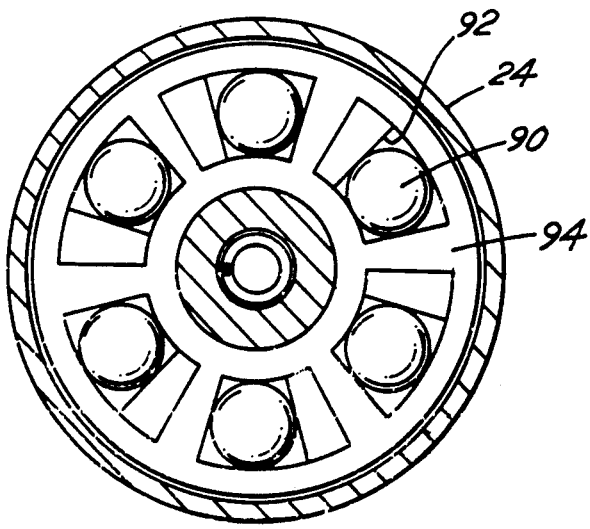
FIG. 5 is a transverse cross-sectional view taken along the line 5—5 in FIG. 3.

FIGS. 1, 2, 7 and 10 are longitudinal cross-sectional views of the invention as incorporated in a pneumatic screwdriver. FIG. 1 depicts the screwdriver positioned above a fastener 21 prior to engagement with the fastener 21. FIG. 2 depicts engagement of a bit 30 of the screwdriver with a fastener 21 to initiate operation of the screwdriver. FIG. 7 depicts the condition of the screwdriver after the fastener 21 has been driven into some material the reaction torque reaches a predetermined or preset level to disengage the clutch. FIG. 10 depicts the condition of the screwdriver subsequent to termination of the flow of air to the air motor of the screwdriver.

The screwdriver includes a main body 10 having a rear housing 12 fixed to the main body 10. A fluid flow inlet fitting 14 is threadably attached to a threaded passage 13 at the rear end of the main body 10 and defines a fluid flow inlet 17 to the tool. The tool has an elongated center line axis 16 which runs the length of the tool and about which the component parts of the tool are generally symmetrical. The centerline axis 16 is the axis of rotation of a rotary vane fluid driven motor (not shown) retained within the housing 10 having an output shaft 20. A forward tubular housing 24 is threadably attached to the forward end of the housing 10 and includes a bit holder 28 that cooperates with a bit 30, in this instance a screwdriver bit. The bit holder 28, in turn, is connected with the output shaft 20 through a clutch mechanism. Note, the output shaft 20 may be a direct output of the air motor or it may comprise the output shaft of a transmission interposed intermediate the air motor output shaft and the drive shaft 20. In any event, an output shaft 20 derives its power from the air motor.

A central passage 18 extends through the housing 10 and through all of the components comprising the air motor, a transmission and output shaft 20. The bore 18 thus connects with the fluid flow inlet 17 to provide a passage for air to the air motor (not shown) within the body 10 so as to power or operate the motor.

The output shaft 20 whether directly extending from the motor or from an intermediate transmission is mounted in bearings 22 supported within the internal diameter of the housing or body 10. Thus, the output shaft 20 is driven about the axis 16. The forward housing 24 is threadably attached to the main body or housing 10 and comprises a generally cylindrical tubular member which extends forward co-axially with axis 16. The housing 24 thus includes a cylindrical passage of varying diameters which encloses or encompasses the components comprising the bit holder 28 and clutch components to be described below.

An annular bearing 26 is retained on the inside of the housing 24 and cooperates with the cylindrical outside surface of the bit holder 28 so that the bit holder 28 may be rotated within housing 24 and may also be translated both axially with respect to the housing 24. The bit holder 28 includes a forward keyed passage 31 for receipt of the bit 30. In the embodiment depicted the bit 30 includes an hexagonal cross section back end 33 which is compatibly and slidably received in the passage 31 so that the bit 30 can be slidably inserted and slidably removed from the holder 28. The hexagonal end 33, however, guarantees that as the bit holder 28 rotates about axis 16, the bit 30 will likewise rotate. The bit 30 includes an annular neck section 35 which receives a ball bearing 37 retained by a spring 39. In this manner the bit 30 is retained in the passage 31.

A protective bit support shield or cover 41 is slidably retained within the nose of the housing 24. The cover of 41 is biased by a spring 43 interposed between the cover 41 and the bearing 26 so that the cover of 41 is biased axially forwardly. The cover 41 is retained by a spring biased pin 45 that extends through the nose of the housing 24 and engages in a slot 47 in the cover 41.

Intermediate the bit holder 28 and the output shaft 20 of the air motor is the clutch mechanism of the reset assembly and torque control mechanism of the invention. The clutch mechanism includes a driving clutch member 32 which is keyed to the shaft 20 at one end and which fits into the bit holder 28 at its opposite end so as to be rotational with respect thereto. The bit holder 28 and driving clutch member or spindly 32 are thus axially translatable along the axis 16 co-jointly, but are designed to rotate independently except when coupled together by means of the clutch mechanism to be described below. The clutch member 32 thus includes a circumferential groove 34 which receives ball bearings 36 retained on the inner counterbore end of the bit holder 28. The cooperative interaction of bearings 36 with the driving clutch member 32 serve to maintain the bit holder 28 and driving clutch member 32 in an aligned axial position in a more efficient and improved manner relative to the tool disclosed in U.S. Pat. No. 4,880,064. Thus, the ball bearing arrangement utilizing ball bearings 36 tends to reduce tipping of the bit holder 28 with respect to the spindle or driving clutch member 32 caused by variations of operator technique such as angular attack upon the fastener 21. This is an important improvement of the present invention, relative to the prior art. Note, the ball bearings 36 are retained in position by a pin 47 and spring clip 40.

In review, then the clutch member 32 and bit holder 28 may move co-jointly in the axial direction from the position depicted in FIG. 1 to the position shown in FIG. 2, for example, in response to axial force imparted to a bit 30 which is engaged against a fastener 21. The opposite end of the clutch member 32 includes a counterbore 42 which slidably receives the drive shaft 20. The drive shaft 20 is keyed to the counterbore 42, for example, by virtue of the counterbore and shaft having a hexagonal cross-sectioned shaped. The counterbore 42 extends axially from the end of the spindle or driving clutch member 32 in a series of reduced diameter sections as depicted in the FIGURES. The counterbore 42 connects with a radial passage or transverse passage 44 through the spindle or clutch member 32. A valve rod 46 having a cylindrical shape of varying diameter is slidably received in the bore 42. The rod 46 interacts with a valve stem 49 associated with a valve member 48 that cooperates with a seat in the central passage 18. The valve member 48 is thus normally seated due to the operation of a coil spring 50 which is biased against the inlet fitting 14 on one side and against the valve member 48 on the other side. The valve stem 49 extends through the central passage 18 and through the output shaft 20 to engage against the valve rod 46. A second coil spring 52 is retained within the bore 42 and biases against the valve rod 46 to maintain the rod in contact with the rod or valve stem 49. The strength of the string 50 and the spring constant of the spring 50 exceeds that of the spring 42 so that the valve member 48 is constantly biased to the left in the FIGURES as a result of the cumulative total of spring forces on the valve member 48.

A third spring 53 is a coil spring which is interposed between the output shaft 20 and a land 54 on the inside counterbore 42 so as to act on the spindle or driving clutch member 32. Thus, spring 54 tends to move the assembly comprising the spindle 32 and bit holder 28 to the left in FIGURES against any manual or mechanical force that might be placed against the bit 30.

The valve rod 46 includes an annular groove 56 which is positioned generally opposite the transverse or radial passage 44. Three small ball bearings 58 fit within the passage 44 and are retained within the annular groove 56 by means of a collar 60 which is biased by a spring 62 to the left in the FIGURES. When the screwdriver or tool is in its rest position ready for initiation of operation the configuration of the collar 60 is as depicted in FIG. 1. Note, the sleeve or collar 60 includes an inside annular surface 66 (as shown in FIG. 8), which acts as a limiting surface with respect to movement of the ball bearings 58. The surface 66 is connected via an inclined surface 68 to a second limiting surface 70, again as depicted in FIG. 8. The spring 62 is retained in position on the outside of the spindle 32 by means of a lock washer 72 which cooperates with a retention collar 74 again as depicted in FIG. 8.

A slidable sleeve 76 is also retained on the outside of the spindle 32. The slidable sleeve 76 includes a generally planar annular bearing surface 78 which may be defined by a washer 77, for example, against which roller bearings, 80 are retained by means of a collar 82. This assembly is biased to the left as depicted by the FIGURES by a coil spring 84 which fits over the entire spindle 32. The coil spring 84 is adjustably biased against the collar 82 by means of a nut 86 which is threaded unto the outside of spindle 32 and acts against a spring retaining member 88. Ball bearings 90 are retained in circular passages 92 defined in a flange 94 of the spindle 32. The ball bearings 90 fit within pockets 96 which are radially spaced from the axis 16 in the face of the bit holder 28. Normally, the ball bearings 90 will bottom out in the pockets 96.

Figure 6:
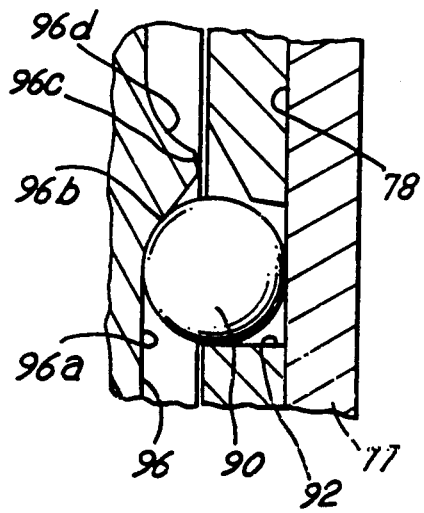
FIG. 6 is an enlarged cross-sectional view depicting the cooperative interaction of the roller members and the ramp construction in the clutch mechanism.

The configuration of the pockets 96 is an important aspect of the invention. FIGS. 6 and 12 depict the cross sectional configuration of the pockets 96 in greater detail since these FIGURES depict a side cross-sectional view of each of the pockets 96. Thus, each pocket 96 associated with a ball bearing 90 has distinct configuration or shape. As depicted in FIG. 6, the pocket 96 includes a generally planar base section 96a which connects with an upwardly extending ramp 96b. The ramp at 96b is inclined at an angle in the range of about 25° to 45° from a plane that is perpendicular to the axis 16. The ramp 96b extends from pocket 96 in the direction of normal rotation of the tool as it is being used for a fastening operation. For example, a typical screwdriver will rotate in the clockwise sense. Thus the ramp 96b will be directed in the clockwise sense and the ball bearing 90 come to rest against that ramp 96b during operation of the tool. The ramp 96b extends upwardly to the generally planar surface of the end of the bit holder 28. The ramp 96b then terminates with a slightly downwardly inclined surface 96c and then into the backside curved surface 96d of the next adjacent pocket 96. The curved surface 96d as depicted in FIG. 12 has a radius of curvature which is substantially identical to the radius of the ball bearing 90.

Operation

The drawing and in particular FIGS. 1, 2, 7 and 10 depict the sequence of operation of the mechanism of the invention. FIG. 1 shows the tool in the rest or reset condition prior to fitting the tool against the threaded fastener 21. FIG. 2 shows the tool during the tightening down operation on a fastener 21. FIG. 7 shows the clutch mechanism responding to torque transmitted from the air motor just prior to shut-off. FIG. 10 shows the clutch after tool shut-off and prior to being reset.

Initially high pressure air enters the inlet fitting 14 and flows through the passage 16 to the valve member 48. Valve 48 is actuated by engaging the bit 30 with the fastener 21 to thereby translate the bit 30, bit holder 28, spindle 32, valve rod 46 and thus rod 49 to the right from the position shown in FIG. 1 to the position shown in FIG. 2. This opens the valve 48 permitting air flow to the air motor. Note, in this circumstance, the biasing force of the spring 53 is initially overcome. In addition, the bearings 58 act in the groove 56 and preclude the valve rod 42 from moving and thus the rod 49 is extended to the position shown in FIG. 2, thereby opening the valve 48.

When the valve 48 opens the motor is allowed to operate and rotation and torque is transmitted through the output shaft 20, the spindle 32, ball bearings 90 and bit holder 28 to the base section 96a and/or bit 30. The balls 90 are engaged against the incline surface 96b as depicted in FIG. 6 during the operation of the screwdriver so long as the torque required to turn the fastener 21 does not exceed a threshold level which is dependent upon the spring force associated with the spring 84. As torque transmitted to the bit holder 30 is increasingly resisted by the reactionary torque from the fastener 21, the balls 90 roll up the ramps 96b. When the axial component of the normal force applied to the balls by the ramps 96b surpasses the biased load applied to the balls 90 by the spring 84, the balls 90 begin to move upward on the ramps 96b. The ramping of the balls 90 results in the rearward motion of the race assembly defined by the washer 76, roller bearings 80 and sleeve 82. As this occurs, there is a point at which the sleeve 82 moves the collar 60 to the right in the FIGURES. When the collar 60 is sufficiently moved to the right of the FIGURES, the force of the spring 50 on rod 49 and valve rod 56 causes the valve rod 46 and more particularly the edges of the grooves 56 to engage the ball members 58. The ball members 58 then ride outwardly in the radial opening or passage 44 against the surface 68 and then against the surface 70. This releases the engagement of the ball members 53 against the valve rod 46 thereby permitting the valve member 48 to close. This occurs upon the reaching of a threshold torque which permits adequate ramping of the balls 90 up the ramp 96b.

Note, as long as the pressurized air is supplied to the air motor, however, an increasing amount of torque will be transmitted through the balls 90 to the bit holder 28. This increase in torque occurs until the balls 90 approach the top of the ramps at which time the valve 48 is closed as described previously. After the motor shut-offs one of two possible outcomes will occur. Either there will be enough residual kinetic energy in the rotating motor and gearing parts to cause the balls 90 to roll over the top of the ramp 96b and over the top surface 96c into the next adjacent recess 96. Alternatively, there will not be enough kinetic energy to allow the balls 90 to roll upward and over surface 96c. They will then roll back to the bottom of surface 96b. In either event, the valve 48 will be closed. When the direction of the motor is reversed, for example, when unseating a fastener, it is desirable to disable the shut-off feature of the clutch and thereby use a full stall torque of the motor for operation in reverse. This ensures that any fastener seated by a tool can be unseated without making an adjustment to the clutch. This is accomplished by putting an angle on the backside of the pocket 96 which permits an increased amount of torque to be imparted by the motor to the bit holder in reverse operation. This is accomplished by providing the surface 96d which is generally compatible with the spherical surface associated with the ball bearing 90. Thus, the additional axial component of force to overcome and move the balls 90 upward on the surface 96d is such that it is greater than the torque associated with the surface 96b when the tool is operated in the forward direction. By appropriately controlling the shapes of the surfaces 96b and 96d it is possible to control with great certainty the characteristics of the operation of the tool in both the forward and reverse directions.

Finally, an additional feature of the invention which has been described and which does impact on the operation is the use of a supplemental spring 100 in FIG. 1 which applies a consistent force from the output shaft 20 against the valve rod 46. This additional spring 100 improves operation of the tool, particularly at the higher torque level or threshold torque level of the tool.

While there has been set forth the preferred embodiment of the invention, it is to be understood that the invention has to be limited only by the following claims and their equivalents.

What is claimed is:

1. In a fluid powered tool of the type including a housing with a forward end, an intermediate section and a rear end, a fluid driven motor in the housing with a rotary output shaft defining an axis of rotation, a fluid inlet to the motor, a valve member cooperative with the fluid inlet to control fluid flow to the motor, a bit holder for a tool bit at the forward end of the tool and a clutch mechanism in the intermediate section and connecting the output shaft with the bit holder, the output shaft, bit holder and clutch mechanism being substantially coaxial, the improvement comprising, in combination:
 a torque responsive, fluid flow start, shut-off and reset mechanism incorporated in the clutch mechanism, said torque responsive mechanism including:
 (a) means for support of the bit holder in the housing to permit both rotary and axial movement;
 (b) a driving clutch member keyed at one end to the output shaft for simultaneous rotation with the output shaft and attached at its opposite end to the bit holder to permit simultaneous axial movement with the bit holder and independent rotary movement relative to the bit holder;
 (c) clutch engaging means for mechanically connecting the driving clutch member to the bit holder for simultaneous rotary movement, said means including at least one biased roller member intermediate the clutch member and the bit holder, said roller member radially spaced from the axis of rotation and axially movable with respect to one of the driving clutch member and bit holder, said roller member biased by roller member biasing means into a receiving pocket of the other of the driving clutch member and bit holder during rotary driving operation of the tool below a torque threshold, said roller member axially translatable from said receiving pocket during driving operation of the tool above said torque threshold whereby the bit holder and driving clutch member rotationally disengage;

(d) an axial counterbore in the driving clutch member extending from the motor output shaft;

(e) a valve control rod in the counterbore having a forward end and mechanically connected at the other end to the valve member;

(f) valve control rod biasing means for axially biasing the valve member and the valve control rod toward a valve member closed position;

(g) driving clutch member biasing means in the axial counterbore of the driving clutch member for biasing the driving clutch member axially toward the forward end relative to the output shaft;

(h) a radial passage in the driving clutch member intersecting the counterbore;

(i) a radially displaceable member in the radial passage cooperative with the forward end of the valve control rod;

(j) an axially displaceable sleeve over the driving clutch member radial passage, said disposable sleeve having first and second radial limiting means both cooperative with the radially displaceable member to control the position of said radially displaceable member in the radial passage to thereby control the axial position of the valve control rod in the counterbore;

(k) sleeve biasing means for normally biasing the sleeve to a first radial limiting position corresponding to engagement with the first radial limiting means wherein the valve control rod is extended axially toward a valve open position; and (l) one of the bit holder and the clutch member including a transverse flange with a pocket defined therein and the other of the bit holder and the clutch member including an axial bore for receipt of the roller member said pocket having a shaped configuration with a planar base section, an inclined ramp section for cooperation with the roller during driving of the bit holder, said base section being generally planar and transverse to the axis of rotation, said ramp section forming an angle in the range of 25° and 45° with the base section, said inclined ramp section connected to a downwardly inclined surface which connects with the opposite side of the next adjacent pocket, the opposite side defining a curved surface having a radius of curvature substantially identical to the radius of the roller member;

whereby to start the motor by opening the valve member the bit holder is axially translated rearwardly against the force of the value control and biasing means and the driving clutch member biasing means as the driving clutch member and bit holder are rotationally engaged, and the sleeve is in the first limiting position to hold the valve control rod in the rearward position and cause the valve member to open;

whereby to control torque the rotatably connected driving clutch member and bit holder are disengaged when the torque threshold is exceeded and the roller member is axially translated rearwardly against the force of the ball members biasing means to simultaneously translate the sleeve to the second limiting position thereby permitting the radially displaceable member to move radially outward in the passage and release the control rod for movement toward the forward end and close the valve member to terminate operation of the motor; and whereby to reset the mechanism, release of axial force on the bit holder permits the bit holder and shaft to move axially forward in response to drive clutch member biasing means and the sleeve biasing means to effect subsequent radial movement of the radially displaceable member to the first limiting position.

2. The improvement of claim 1 wherein the sleeve is axially driven by the roller member in the rearward end direction and by sleeve biasing means in the forward end direction.

3. The improvement of claim 2 wherein the sleeve biasing means and the roller biasing means comprise coaxial spiral spring members fitted over the driving clutch member.

4. The improvement of claim 2 wherein the roller member biasing means is adjustable.

5. The improvement of claim 3 wherein the means for biasing the roller member is adjustable.

6. The improvement of claim 1 including a supplemental spring interposed between the output shaft of the rotary motor and the valve control rod for constantly biasing the rod toward engaging with the radially displaceable member and toward the forward end of the tool.

* * * * *